United States Patent
Kroll et al.

(10) Patent No.: US 6,629,168 B1
(45) Date of Patent: Sep. 30, 2003

(54) BYTE-SWAPPING FOR EFFICIENT USE OF MEMORY

(75) Inventors: Kimberly K. Kroll, Horseshoe Bend, ID (US); Paula D. Repman, Boise, ID (US); Charles D. Smith, Meridian, ID (US); R. Alexis Takasugi, Eagle, ID (US); Stewart R. Wyatt, Boise, ID (US); Mark J. Simms, Bristol (GB); Julie Hogan, Dublin (IE); Thomas Carter, Dublin (IE); Fintan Buckley, Dublin (IE)

(73) Assignee: Hewlett-Packard Development Company, LP., Houston, TX (US)

( * ) Notice: Subject to any disclaimer, the term of this patent is extended or adjusted under 35 U.S.C. 154(b) by 525 days.

(21) Appl. No.: 09/595,581

(22) Filed: Jun. 15, 2000

(51) Int. Cl.$^7$ ................................................. G06F 3/00
(52) U.S. Cl. ........................... 710/52; 710/30; 712/225; 711/100
(58) Field of Search ................................ 710/4, 30, 31, 710/33, 35, 52–57, 65, 107; 712/225; 711/100

(56) References Cited

U.S. PATENT DOCUMENTS

| | | | | |
|---|---|---|---|---|
| 4,157,586 A | * | 6/1979 | Cannon et al. | 364/200 |
| 4,204,634 A | * | 5/1980 | Barsuhn et al. | 371/38 |
| 4,499,539 A | | 2/1985 | Vosacek | |
| 4,680,702 A | * | 7/1987 | McCarthy | 364/200 |
| 4,875,155 A | * | 10/1989 | Iskiyan et al. | 364/200 |
| 5,369,651 A | * | 11/1994 | Marisetty | 371/40.1 |
| 5,513,332 A | * | 4/1996 | Wimer et al. | 711/100 |
| 5,721,954 A | * | 2/1998 | Shrock et al. | 710/24 |

FOREIGN PATENT DOCUMENTS

WO    WO 91/03785 A    3/1991

OTHER PUBLICATIONS

U.K. Search Report.

* cited by examiner

Primary Examiner—Jeffrey Gaffin
Assistant Examiner—Rijue Mai

(57) ABSTRACT

Byte-swapping in a buffer memory system utilizes a byte-swapping register to avoid wasteful unused buffer memory spaces that may result from a data transfer of partial word data, i.e., bytes of data less than the number of bytes in a word, to the buffer memory. When a data transfer request, e.g., a write request, requires a transfer of a partial word, the partial request is written to a word in the buffer memory, and is also stored in the byte-swapping register. In a subsequent data transfer request, the partial word stored in the byte-swapping register is combined and concatenated with sufficient bytes of data of the subsequent data transfer request to produce a complete word. The complete word is written in the word in the buffer memory, replacing the previously stored partial word, and thus fills the previously unused buffer memory space.

22 Claims, 4 Drawing Sheets

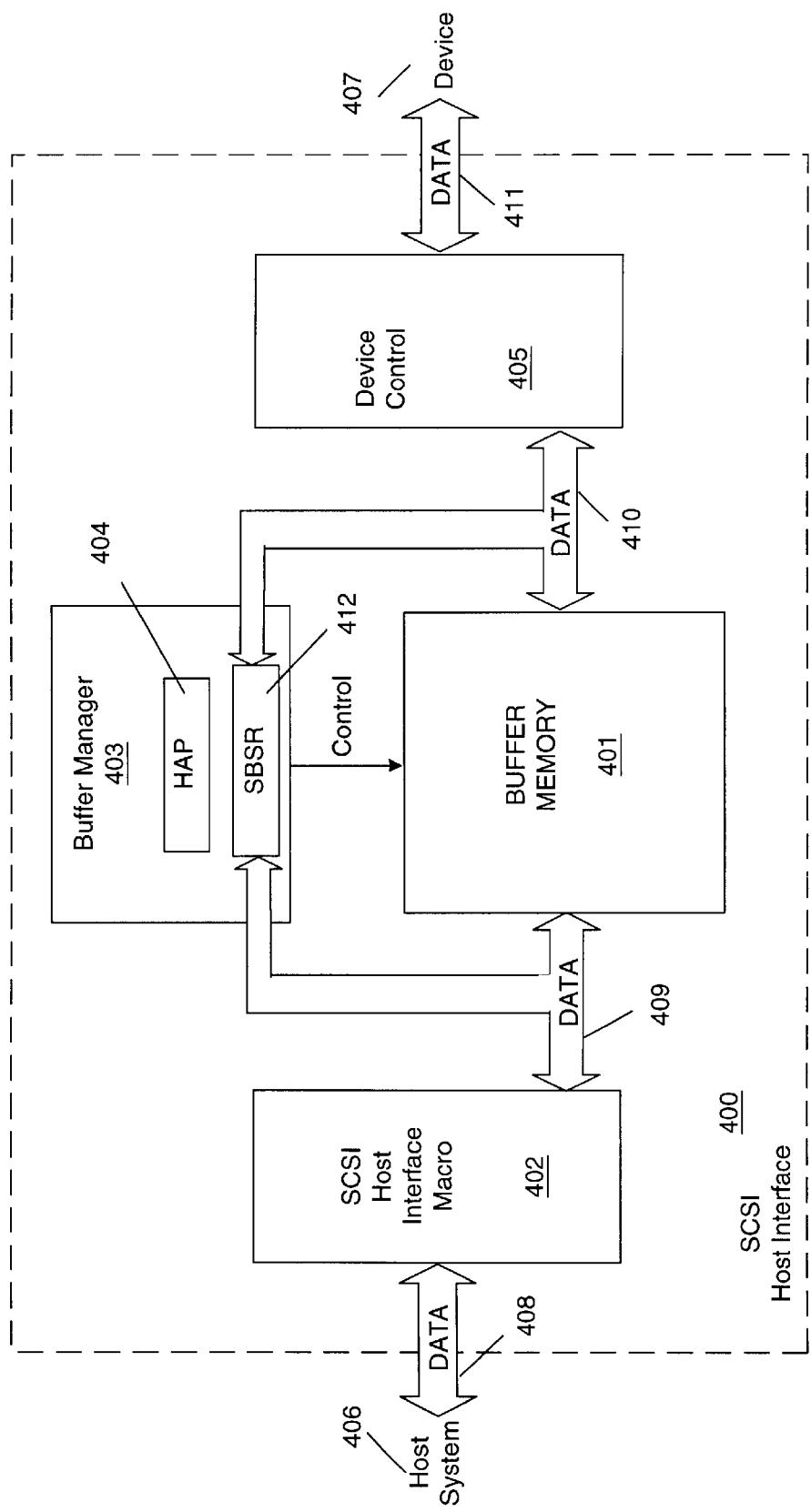

BYTE-SWAPPING FOR EFFICIENT USE OF MEMORY

TECHNICAL FIELD

The invention relates to computer and memory systems. More particularly, the invention relates to efficiency enhancement of memory usage.

BACKGROUND ART

Various components of a computing system utilize memory devices to store and/or retrieve information. Usage of memory devices is not limited to a main computer unit, e.g., the mother board, but is ubiquitous in virtually every component of a computing system, e.g., input/output (I/O) devices (e.g., keyboards, pointing devices, display monitors and the like), peripheral devices (e.g., hard drives, tape drives, printers and the like) and bus and/or network interface devices (e.g., bus bridges, local area network (LAN) interface cards). There are various types of memory devices currently available in the market, e.g., a dynamic random access memory (DRAM), static random access memory (SRAM), electrically erasable read-only memory (EEPROM), a hard disk or the like, to which data can be written, and from which data may be read.

Often, a memory device is used as a data buffer to temporarily store received data before sending the same to another component of the computing system, and to thus lessen the effects of data transfer speed differences between various components of the computing system. For example, a host interface device allows a peripheral and/or an I/O device, e.g., a hard drive, a tape drive or the like, to communicate with a host computing system, e.g., a personal computer (PC) or the like, and includes a buffer memory to temporarily hold data being transferred between the host computing system and the peripheral and/or the I/O device. One of the widely accepted standards for host interface is the Small Computer System Interface (SCSI) standard, which is specified by the American National Standards Institute (ANSI X3. 131-1986, which is incorporated herein by reference in its entirety) of New York, N.Y., U.S.A.

Unfortunately, while a memory device allows adequate data transfer between computing entities having different data transfer rates, there are a number of drawbacks in a conventional buffer memory. In particular, while memory devices are typically organized into a plurality of words of fixed lengths (which are accessed one at a time), an access request to and from the memory devices, i.e., a write or a read, may result in a variable number of bytes of data transfer. For example, a host interface device based on the SCSI protocol transfers data in blocks that may be of fixed or variable length, e.g., varying from 1 byte to $2^{24}-1$ bytes. The buffer memory embedded in the host interface device, however, may be organized into 36 bit words (32 bits of data, i.e., 4 bytes, and 4 bits for control, e.g., error correction or the like), and may be accessed a word at a time.

When an access request to the buffer memory involves a transfer of data block of size which is not a multiple of four bytes, at least one word of the buffer memory is left only partially filled. For example, a write of five bytes to the buffer memory would write to two words, the second word of which containing only one byte, and having three bytes remaining unused. Because, in a conventional buffer memory system, the next write to the buffer memory would write to a new word, i.e., a subsequent memory location, the three unused byte locations of the buffer memory are left unused until the partially filled word location is written to again. As can be appreciated, a conventional buffer memory system may have many gaps of unused memory locations at any given time due to transfers of partial words, and is thus wasteful of valuable buffer memory space.

Thus, there is a need for a more efficient method of and system for providing a buffer memory, which utilizes every available memory space of the buffer memory.

SUMMARY OF INVENTION

In accordance with the principles of the present invention, a method of transferring data to and from a buffer memory organized into a plurality of fixed length words comprises receiving a request to transfer a first data, determining if transfer of the first data results in a transfer of a partial word, storing, if transfer of the first data results in a transfer of a partial word, the partial word in a temporary holding area, receiving a subsequent request to transfer a second data, and transferring, if at least a portion of the second data and the partial word together have a sufficient size to produce a complete word, the complete word comprising at least a portion of the second data and the partial word combined together.

In accordance with another aspect of the present invention, an apparatus for transferring data to and from a buffer memory organized into a plurality of fixed length words comprises a data bus configured to receive a request to transfer a first data and a subsequent request to transfer a second data, a temporary holding area for storing, if transfer of the first data results in the transfer of a partial word, the partial word, a buffer management unit in operable communications with the data bus, the buffer memory and the temporary holding area, the buffer management unit configured to transfer, if transfer of the first data results in a transfer of the partial word, and if at least a portion of the second data and the partial word together have a sufficient size to produce a complete word, the complete word comprising at least a portion of the second data and the partial word combined together.

In accordance with yet another aspect of the present invention, a buffer memory system comprises a buffer memory organized into a plurality of fixed length words, a byte swap register, and a buffer management unit in communication with the buffer memory and the byte swap register, the buffer management unit being configured to store a partial word, resulting from a data transfer request, in the byte swap register, and the buffer management unit being configured to transfer a completed word produced by combining the partial word stored in the byte swap register and at least a portion of data in a subsequent data transfer request.

DESCRIPTION OF DRAWINGS

Features and advantages of the present invention will become apparent to those skilled in the art from the following description with reference to the drawings, in which:

FIG. 4 is a block diagram showing an exemplary embodiment of a buffer memory system implemented in a small computer system interface (SCSI) host interface in accordance with the principles of the present invention.

DETAILED DESCRIPTION OF PREFERRED EMBODIMENTS

For simplicity and illustrative purposes, the principles of the present invention are described by referring mainly to an exemplary embodiment, particularly, with a specific exemplary implementation of buffer memory system in a SCSI host interface system. However, one of ordinary skill in the art would readily recognize that the same principles are equally applicable to, and can be implemented in, other implementations and designs using any other buffer memory system, and that any such variation would be within such modifications that do not depart from the true spirit and scope of the present invention.

In accordance with the principles of the present invention, byte-swapping in a buffer memory system utilizes a byte-swapping register to avoid wasteful unused buffer memory spaces that may result from a data transfer of partial word data, i.e., bytes of data less than the number of bytes in a word, to the buffer memory. When a data transfer request, e.g., a write request, requires the transfer of a partial word, the partial request is written to a word in the buffer memory, and is also stored in the byte-swapping register. In a subsequent data transfer request, the partial word stored in the byte-swapping register is combined and concatenated with sufficient bytes of data of the subsequent data transfer request to produce a complete word. The complete word is written in the word in the buffer memory, replacing the previously stored partial word, and thus fills the previously unused buffer memory space.

Figure 1:
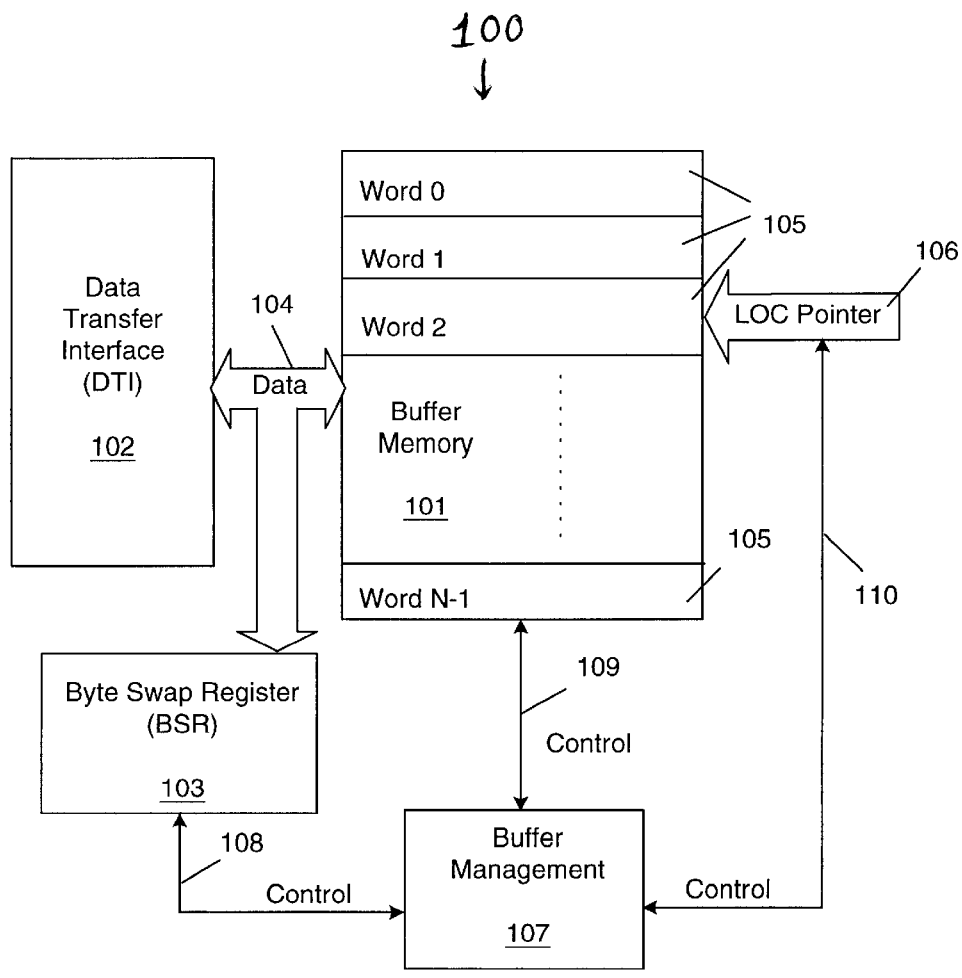
FIG. 1 is a block diagram showing an exemplary embodiment of a buffer memory system in accordance with the principles of the present invention.
Figure 1A:
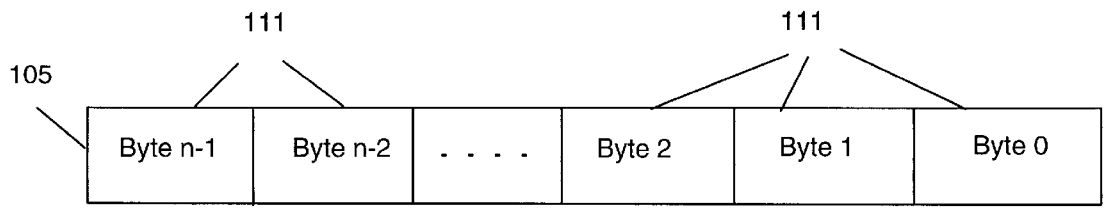
FIG. 1A is a block diagram showing an exemplary embodiment of a word of the buffer memory system shown in FIG. 1.

In particular, FIG. 1 shows an exemplary embodiment of a buffer memory system 100 in accordance with the principles of the present invention, which comprises a buffer memory 101, which may be implemented with a data storage device capable of being written to and read from, e.g., a dynamic random access memory (DRAM), static random access memory (SRAM) or the like, and which is organized into a plurality of words 105 (e.g., N words, word 0 through word N−1), each of which comprises a plurality of bytes of data storage space 111 (e.g., n bytes, byte 0 through byte n−1) as shown in FIG. 1A. In an embodiment of the present invention, the buffer memory 101 is implemented as a first-in-first-out (FIFO) buffer.

The buffer memory system 100 also comprises a data transfer interface (DTI) 102, which transfers data to and from the buffer memory 101 via the data bus 104. The buffer management unit 107 manages the operation, e.g., the read/write operations, of the buffer memory 101 by providing control signals 109 to satisfy the data transfer requests from the DTI 102. The byte-swap register (BSR) 103, under the control of the buffer management unit 107 via the control signals 108, stores and sends portions of data being transferred between the DTI 102 and the buffer memory 101. In an embodiment of the present invention, the BSR 103 is (n−1) byte wide, i.e., contains one byte less space than a word in the buffer memory 101. Although, for clarity, the BSR 103 is shown in FIG. 1 as a physically separate component, the BSR may be physically located as a part of the DTI 102, the buffer management 107 or even as a part of the buffer memory 101.

The buffer memory system 100 further comprises a location pointer (LOC pointer) 106, which points to the current location, i.e., the last word that contains valid data, and which may be implemented as a binary up-down counter, or in the alternative with a register or the like. Although, for clarity, the LOC pointer 106 is shown in FIG. 1 as a physically separate component, the LOC pointer 106 may be physically located as a part of the DTI 102, the buffer management unit 107 or even as a part of the buffer memory 101. The LOC pointer 106 is incremented and decremented under the control of the buffer management unit 107 via the control signals 110.

The inventive process of data transfer to and from a buffer memory in accordance with the principles of the present invention will now be described with references to FIGS. 2 and 3.

Figure 2:
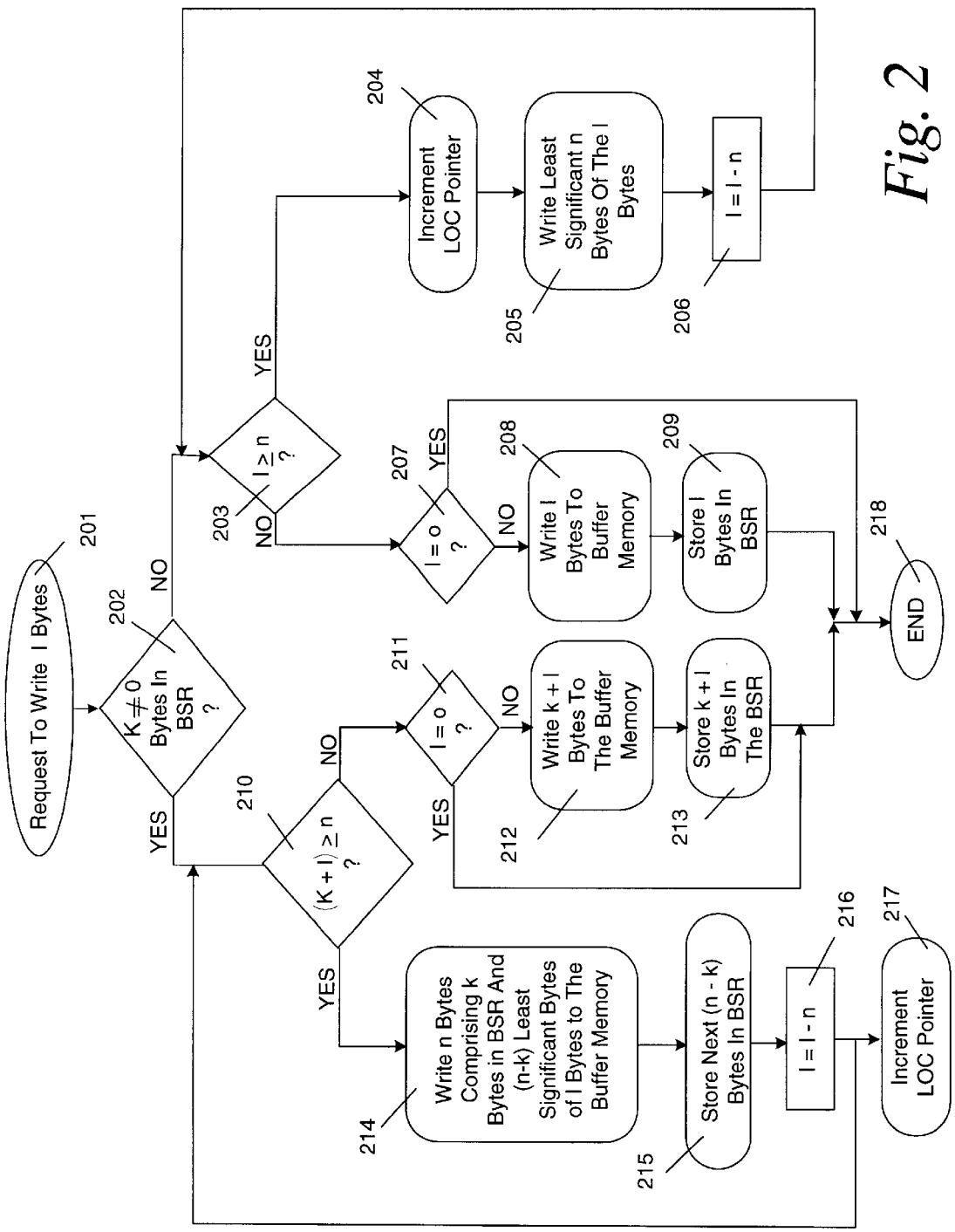
FIG. 2 is flow diagram illustrative of an exemplary embodiment of the process of handling a write request to the buffer memory in accordance with an embodiment of the principles of the present invention.

FIG. 2 shows a flow diagram of the process of handling a write operation in accordance with an embodiment of the present invention, in step 201 of which the buffer management unit 107 receives from the DTI 102 a request to write l bytes of data to the buffer memory 101.

Upon receiving the request, in step 202, the buffer management unit 107 determines whether the current word location of the buffer memory 101 being pointed to by the LOC pointer 106 contains a complete word. In an embodiment of the present invention, the determination is accomplished by inquiring whether the BSR 103 contains any valid data, i.e., (k≠0) bytes of data. If the BSR 103 contains valid data, the current word is determined to be incomplete. However, other means of determining whether the current word is complete may be used. For example, in an alternative embodiment, a byte counter (not shown) may be provided to count the number of bytes of data presently stored in the current word being pointed to by the LOC pointer 106.

If it is determined that the current word location contains a complete word, then, in step 203, the buffer management unit 107 further determines if the number of bytes of data requested to be written (i.e., l bytes) is greater than or equal to the word width (i.e., n bytes) of the buffer memory 101. If l is greater than or equal to the word width, there is enough data to complete at least one word, and thus the LOC pointer 106 is incremented to the next word location in the buffer memory 101 in step 204, and the least significant n bytes of the l bytes of the requested data are written to the word location in the memory buffer 101 in step 205.

In step 206, the number of bytes of the requested data remaining to be written is determined by subtracting n from l, and steps 203 through 206 are repeated until the number of bytes remaining to be written is no longer greater than equal to n.

If the number of bytes to be written (l) is less than n, as determined in step 203, the buffer management unit 107 determines whether the current value of l is zero in step 207, and if it is zero, the handling of the write request is deemed completed, and the process ends in step 218. If, on the other hand, there are number of bytes (less than n bytes) remaining to be written, those remaining bytes are written to the buffer memory in step 208, and are also stored in the BSR 103 in step 209, and the process ends in step 218.

If it is determined, in step 202, that the word location, being pointed by the LOC pointer 106 at the time of the write request, contains an incomplete word, the buffer management unit 107 makes a determination whether the sum of the number of bytes in the BSR 103 and the number of bytes of data requested to be written (i.e., k+l) is greater than or equal to the word width n in step 210. If k+l is less than n, then, the buffer management unit 107 determines whether the current value of l is zero in step 211, and if it is zero, the handling of the write request is deemed completed, and the process ends in step 218. If, on the other hand, l is not zero, the k bytes from the BSR 103 and the requested l bytes of data are written to the word location in the buffer memory 101 currently being pointed to by the LOC pointer 106, and are stored in the BSR 103 in steps 212 and 213, respectively. Then, the process ends in step 218.

If, on the other hand, k+l is determined, in step 210, to be greater than or equal to the word width n, the k bytes of the BSR 103 and the least significant (n−k) bytes of the requested data is written to the current word location in the buffer memory 101. Then, in step 215, the next least significant (n−k) bytes of the remaining requested data are stored in the BSR 103.

In step 216, the number of bytes of the requested data remaining to be written is determined by subtracting n from l. The LOC pointer 106 is incremented to point to the next word location of the buffer memory 101 in step 217, and steps 210, 214, 215, 216 and 217 are repeated until the number of bytes k+l is no longer greater than equal to n.

Figure 3:
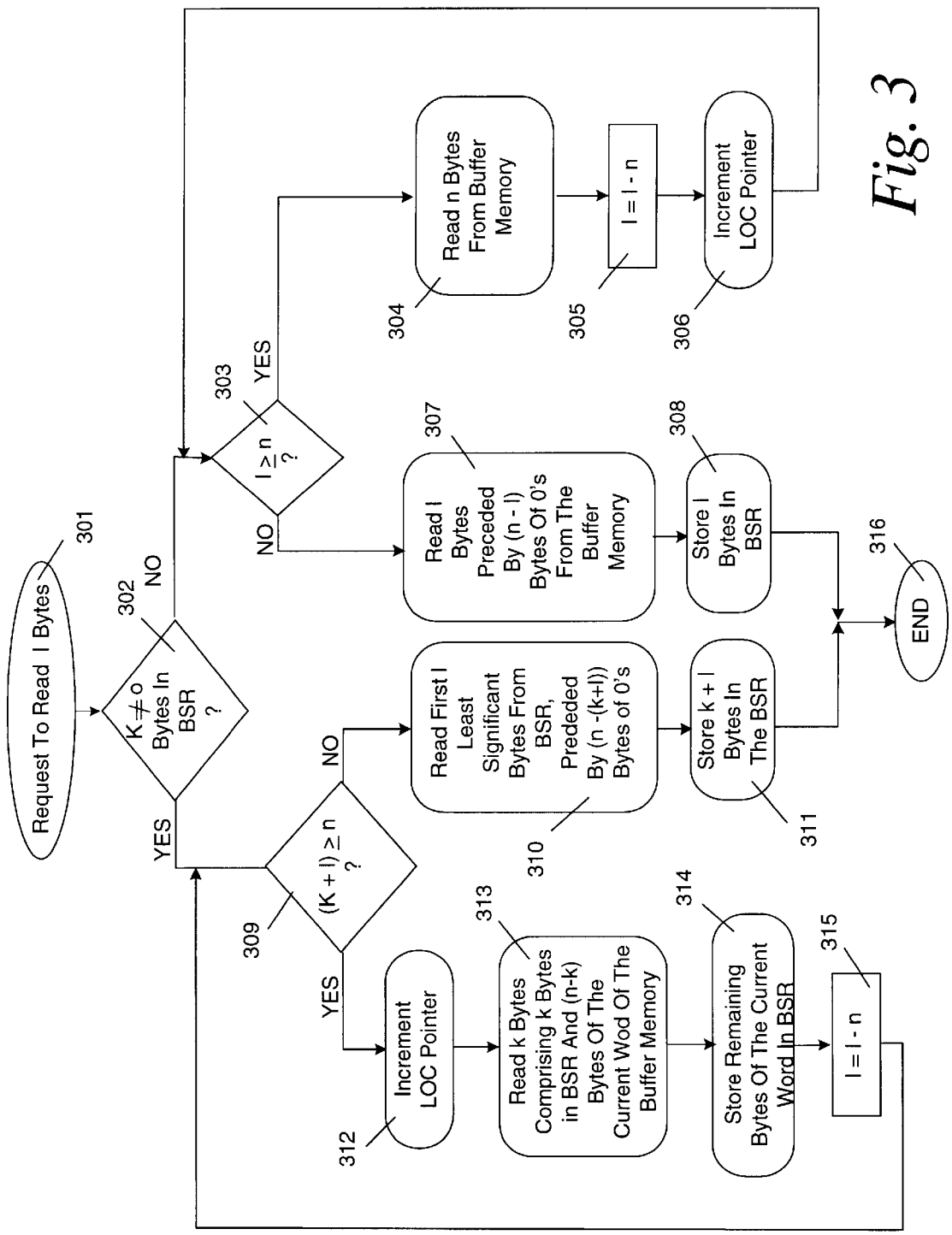
FIG. 3 is flow diagram illustrative of an exemplary embodiment of the process of handling a read request to the buffer memory in accordance with an embodiment of the principles of the present invention.

FIG. 3 shows a flow diagram of the process of handling a read operation in accordance with an embodiment of the present invention, in step 301 of which the buffer management unit 107 receives from the DTI 102 a request to read l bytes of data from the buffer memory 101.

Upon receiving the request, in step 302, the buffer management unit 107 determines whether the current word location of the buffer memory 101 being pointed to by the LOC pointer 106 contains a word that includes a swapped byte. In an embodiment of the present invention, the determination is accomplished by inquiring whether the BSR 103 contains any valid data, i.e., (k≠0) bytes of data.

If it is determined that the current word does not include a swapped byte, then, in step 303, the buffer management unit 107 further determines if the number of bytes of data requested to be read (i.e., l bytes) is greater than or equal to the word width (i.e., n bytes) of the buffer memory 101. If l is greater than or equal to the word width, at least one complete word can be directly read from the buffer memory 101, and n bytes of the current word location in the buffer memory 101 are read in step 304.

In step 305, the number of bytes of the requested data remaining to be read is determined by subtracting n from l, the LOC pointer 106 is incremented to the next word location in the buffer memory 101 to be read in step 306, and steps 303 through 306 are repeated until the number of bytes remaining to be read l is no longer greater than equal to n.

If the number of bytes to be read (l) is less than n, as determined in step 303, the l least significant bytes of the current word in the buffer memory 101 is read, "byte stuffed" with (n−l) preceding bytes of zeros (0's), and the resulting n byte word is sent to the DTI 102 in step 307. The incomplete word read, i.e., the l bytes, are also stored in the BSR 103 in step 308, and the process ends in step 316.

If it is determined, in step 302, that the word location, being pointed to by the LOC pointer 106 at the time of the read request, contains a swapped byte, the buffer management unit 107 makes a determination whether the sum of the number of bytes in the BSR 103 and the number of bytes of data requested to be read (i.e., k+l) is greater than or equal to the word width n in step 309. If k+l is less than n, then, the first l least significant bytes from the BSR 103 are read, and sent to the DTI 102 with (n−(k+l)) bytes of preceding zeros in step 310. Then, the buffer management unit 107 stores the k+l bytes, i.e., the previous content of the BSR 103 and the newly read bytes, in the BSR 103, and the process ends in step 316.

If, on the other hand, k+l is determined, in step 309, to be greater than or equal to the word width n, in step 312, the LOC pointer 106 is incremented to point to the next word location of the buffer memory 101 to be read. Then, an n byte word comprising the k bytes of the BSR 103 and the least significant (n−k) bytes of the current word location in the buffer memory 101 is read, and sent to DTI 102 in step 313. Then, in step 314, the k remaining bytes of the current word location of the buffer memory is read and stored in the BSR 103. Finally, in step 315, the number of bytes of the requested data remaining to be read is determined by subtracting n from l, and steps 309, 312, 313, 314 and 315 are repeated until the number of bytes k+l is no longer greater than equal to n.

An exemplary embodiment of the present invention, which is implemented as a buffer memory system in a SCSI host interface device 400 is shown in FIG. 4.

The SCSI host interface 400, allows a host system 406, e.g., a personal computer (PC) or the like, to communicate with a SCSI device 407, e.g., a hard disk, a tape drive or the like, and includes a SCSI host interface macro 402 that receives and transmits blocks of data to and from the host system 406 via the data bus 408. The SCSI host interface 400 further comprises a device control 405 which acts as the interface for the SCSI device 407, and receives and sends data to and from the SCSI device 407 via the data bus 411.

The SCSI host interface 400 also comprises a buffer memory 401, which may be implemented with a data storage device capable of being written to and read from, e.g., a dynamic random access memory (DRAM), static random access memory (SRAM) or the like, and which is organized into a plurality of words similar to the buffer memory 101 previously described and as shown in FIG. 1.

The buffer manager 403 manages the operation, e.g., the read/write operations, of the buffer memory 401, to satisfy the data transfer requests from both the SCSI host interface macro 402 and the device control 405 via the data buses 409 and 410, respectively. In a preferred embodiment of the present invention, the buffer manager 403 comprises a SCSI byte-swap register (SBSR) 412 and a host address pointer (HAP) 404. The HAP 404 is a pointer that points to the current word location to and/or from which data transfer is to occur, and may be implemented as a binary up-down counter, or in the alternative with a register or the like. The SBSR 412 is used to temporarily hold partial words being transferred through the data buses 409 and 410. In an alternative embodiment, the SBSR 412 and the HAP 404 may be physically located as a part of any other component of the SCSI host interface 400, or may be physically separate components.

In a preferred embodiment of the present invention, the Entire SCSI host interface 400 is implemented as one integrated circuit, e.g., an application specific integrated circuit (ASIC), with the buffer memory 401 being a dynamic random access memory (DRAM) having a word length of four (4) bytes (i.e., n=4). The SBSR 412 is three bytes wide, with optional additional bits for error correction purposes, e.g., a parity bit.

The following examples are provided to further illustrate the operation of the inventive buffer memory data transfer management with respect to the implementation shown in FIG. 4. Although each of the SCSI host interface macro 402 and the device control 405 may transfer data to and from the buffer memory 401, for the sake of brevity, in the following examples, only the data transfers to and from the SCSI host interface macro 402 shown in the examples. Moreover, for the purpose of the following examples, a four byte (4) word length of the buffer 26 memory 401 is to be assumed.

EXAMPLE 1

This first example as illustrated in Table 1 below, shows a 5 byte write from the SCSI host interface macro 402 to the buffer memory 401. As shown, the transfer begins on a 4 byte boundary. The SCSI host interface macro 402 first requests a transfer of 4 bytes, i.e., bytes 1 through 4. These 4 bytes map directly to the word pointed by the host address pointer (HAP). It is not necessary to store any data in the SCSI byte swap register (SBSR) since transfer of the 4 bytes do not involve a transfer of a partial word. The result of the four bytes being written is shown in the first row of Table 1. The SCSI host interface macro 402 next requests a transfer of the remaining one byte, i.e., byte 5. The host address pointer(HAP)is incremented, i.e., from 0 to 1. For the transfer of byte 5, the buffer manager 403 stores the byte in the buffer memory 401, i.e., DRAM (7:0), and, since this is a transfer of a partial word, the byte is also saved with a SCSI parity bit in the SBSR 412. The saved byte 5 would be re-written with a new parity bit on the subsequent access.

TABLE 1

| SCSI Write of 5 Bytes to the Buffer Memory | | | | | | | | | | | |
|---|---|---|---|---|---|---|---|---|---|---|---|
| SCSI (31:24) | SCSI (23:16) | SCSI (15:8) | SCSI (7:0) | DRAM (31:24) | DRAM (23:16) | DRAM (15:8) | DRAM (7:0) | HAP | SBSR (25:18) | SBSR (17:9) | SBSR (8:0) |
| 4 | 3 | 2 | 1 | 4 | 3 | 2 | 1 | 0 | X | X | X |
| X | X | X | 5 | X | X | X | 5 | 1 | X | X | 5 |

EXAMPLE 2

The example in Table 2 shows a 6 byte write from the SCSI host interface macro 402 to the buffer memory 401. The transfer begins on a byte 1 boundary. The SCSI host interface macro 402 first requests a transfer of 4 bytes, i.e., bytes 6 through 9. All four bytes of data cannot be written directly to the buffer memory as only 3 locations are available at the current HAP, i.e., HAP=1. Thus, the 3 least significant bytes, i.e., bytes 6 through 8 and the least significant byte in the SBSR, i.e., byte 5, are is mapped to the data bus 409 as a complete word. The most significant byte, i.e., byte 9, from the SCSI host interface macro 402 is stored in the SBSR 412. The result of this data transfer is shown in the first row of the table.

The SCSI host interface macro 402 next requests a transfer of the remaining two bytes, i.e., bytes A and B. The two bytes, A and B, are stored in the buffer memory (DRAM) along with the least significant byte in the SBSR 412, i.e., byte 9, to the buffer memory 401, and, since the transfer involves a transfer of a partial word, all 3 bytes must also be saved in the SBSR 412, and are to be re-written on the next access. The result of this data transfer is shown in the second row of the table.

TABLE 2

| SCSI Write of 6 Bytes to the Buffer Memory | | | | | | | | | | | |
|---|---|---|---|---|---|---|---|---|---|---|---|
| SCSI (31:24) | SCSI (23:16) | SCSI (15:8) | SCSI (7:0) | DRAM (31:24) | DRAM (23:16) | DRAM (15:8) | DRAM (7:0) | HAP | SBSR (25:18) | SBSR (17:9) | SBSR (8:0) |
| 9 | 8 | 7 | 6 | 8 | 7 | 6 | 5 | 1 | X | X | 9 |
| X | X | B | A | X | B | A | 9 | 2 | B | A | 9 |

EXAMPLE 3

This third example in Table 3 shows a 7 byte write from the SCSI host interface macro 402 to the buffer memory 401. The transfer begins on a byte 3 boundary. The SCSI host interface macro 402 first requests a transfer of 4 bytes, i.e., bytes C through F. However, only 1 byte location of the word in the buffer memory being pointed to by the current HAP is available. Thus, the least significant byte from SCSI host interface macro 402, i.e., byte C, and the three bytes of the SBSR, i.e., bytes 9 through B, are mapped to the data bus 409, and are written to the buffer memory. The most significant bytes, i.e., bytes D through F, from the SCSI host interface macro 402 are stored in the SBSR 412. The result of this data transfer is shown in the first row of the table.

The SCSI host interface macro 402 next requests a transfer of the remaining three bytes, i.e., bytes 10 through 12. However, only 1 byte location of the word in the buffer memory being pointed to by the current HAP is available. Thus, the least significant byte from SCSI host interface macro 402, i.e., byte 10, and the three bytes of the SBSR, i.e., bytes D through F, are mapped to the data bus 409, and are written to the buffer memory. The most significant remaining bytes, i.e., bytes 11 and 12, from the SCSI host interface macro 402 are stored in the SBSR 412. The result of this data transfer is shown in the second row of the table.

The buffer manager 403 writes the remaining two bytes, 11 and 12, in the next word location in the buffer memory (DRAM), and, since the transfer involves a transfer of a partial word, also to the SBSR 412. The two bytes, 11 and 12, and are to be re-written on the next access. The result of this data transfer is shown in the third row of the table.

TABLE 3

| SCSI Write of 7 Bytes to the Buffer Memory | | | | | | | | | | | |
|---|---|---|---|---|---|---|---|---|---|---|---|
| SCSI (31:24) | SCSI (23:16) | SCSI (15:8) | SCSI (7:0) | DRAM (31:24) | DRAM (23:16) | DRAM (15:8) | DRAM (7:0) | HAP | SBSR (25:18) | SBSR (17:9) | SBSR (8:0) |
| F | E | D | C | C | B | A | 9 | 2 | F | E | D |
| X | 12 | 11 | 10 | 10 | F | E | D | 3 | X | 12 | 11 |
|   |    |    |    | X  | X | 12 | 11 | 4 | X | 12 | 11 |

EXAMPLE 4

Referring to Table 4 below, this final write example shows is a 15 byte write from the SCSI host interface macro 402 to the buffer memory 401. The transfer begins on a byte 2 boundary. The SCSI host interface macro 402 first requests a transfer of 4 bytes, i.e., bytes 13 through 16. However, only 2 byte locations of the word in the buffer memory being pointed to by the current HAP are available. Thus, the least significant bytes from SCSI host interface macro 402, i.e., bytes 13 and 14, and the two bytes of the SBSR, i.e., bytes 11 and 12, are mapped to the data bus 409, and are written to the buffer memory. The remaining most significant bytes, i.e., bytes 15 and 16, from the SCSI host interface macro 402 are stored in the SBSR 412. The result of this data transfer is shown in the first row of the table.

The operation with respect to the next three transfers are similar to the first transfer described above, the results thereof are shown in rows two to four of the table. The final transfer is a transfer of 1 byte, which is stored in the buffer memory and the SBSR to be re-written on the next access as shown in the last row of the table.

TABLE 4

SCSI Write of 15 Bytes to the Buffer Memory

| SCSI (31:24) | SCSI (23:16) | SCSI (15:8) | SCSI (7:0) | DRAM (31:24) | DRAM (23:16) | DRAM (15:8) | DRAM (7:0) | HAP | SBSR (25:18) | SBSR (17:9) | SBSR (8:0) |
|---|---|---|---|---|---|---|---|---|---|---|---|
| 16 | 15 | 14 | 13 | 14 | 13 | 12 | 11 | 4 | X | 16 | 15 |
| 1A | 19 | 18 | 17 | 18 | 17 | 16 | 15 | 5 | X | 1A | 19 |
| 1E | 1D | 1C | 1B | 1C | 1B | 1A | 19 | 6 | X | 1E | 1D |
| X | 21 | 20 | 1F | 20 | 1F | 1E | 1D | 7 | X | X | 21 |
|  |  |  |  | X | X | X | 21 | 8 | X | X | 21 |

The next five examples show read operations with respect to the embodiment shown in FIG. 4. The read operations are similar to the write operations with the exception of "byte stuffing". That is, when a read operation results in a transfer of a partial word, the partial word is preceded by an appropriate number of bytes having a value of zero to complete a word.

EXAMPLE 5

Referring to Table 5 below, this example shows is a 5 byte read from the buffer memory 401 to the SCSI host interface macro 402.

As can be seen the last transfer resulted in a transfer of a partial word, i.e., transfer of only one byte (byte 5), which is byte stuffed with three bytes of zeros.

EXAMPLE 6

Referring to Table 6 below, this example shows is a 6 byte read from the buffer memory 401 to the SCSI host interface macro 402.

TABLE 5

SCSI Read of 5 Bytes from the Buffer

| DRAM (31:24) | DRAM (23:16) | DRAM (15:8) | DRAM (7:0) | HAP | SBSR (25:15) | SBSR (17:9) | SBSR (5:0) | SCSI (31:24) | SCSI (23:16) | SCSI (15:8) | SCSI (7:0) |
|---|---|---|---|---|---|---|---|---|---|---|---|
| 4 | 3 | 2 | 1 | 0 | X | X | X | 4 | 3 | 2 | 1 |
| X | X | X | 5 | 1 | X | X | X | 0 | 0 | 0 | 5 |

TABLE 6

SCSI Read of 6 Bytes from the Buffer

| DRAM (31:24) | DRAM (23:16) | DRAM (15:8) | DRAM (7:0) | HAP | SBSR (25:15) | SBSR (17:9) | SBSR (5:0) | SCSI (31:24) | SCSI (23:16) | SCSI (15:8) | SCSI (7:0) |
|---|---|---|---|---|---|---|---|---|---|---|---|
| 8 | 7 | 6 | 5 | 1 | 8 | 7 | 6 |   |   |   |   |
| X | B | A | 9 | 2 | X | B | A | 9 | 8 | 7 | 6 |
| X | X | X | X | X |   |   |   | 0 | 0 | B | A |

EXAMPLE 7

Referring to Table 7 below, this example shows is a 11 byte read from the buffer memory 401 to the SCSI host interface macro 402.

TABLE 7

SCSI Read of 11 Bytes from the Buffer

| DRAM (31:24) | DRAM (23:16) | DRAM (15:8) | DRAM (7:0) | HAP | SBSR (25:18) | SBSR (17:9) | SBSR (8:0) | SCSI (31:24) | SCSI (23:16) | SCSI (15:8) | SCSI (7:0) |
|---|---|---|---|---|---|---|---|---|---|---|---|
| C | B | A | 9 | 2 | X | X | C |   |   |   |   |
| 10 | F | E | D | 3 | X | X | 10 | F | E | D | C |
| 14 | 13 | 12 | 11 | 4 | X | X | 14 | 13 | 12 | 11 | 10 |
| X | X | 16 | 15 | 5 | X | X | X | 0 | 16 | 15 | 14 |

EXAMPLE 8

Referring to Table 8 below, this example shows is a 5 byte read from the buffer memory 401 to the SCSI host interface macro 402.

TABLE 8

SCSI Read of 5 Bytes from the Buffer

| DRAM (31:24) | DRAM (23:16) | DRAM (15:8) | DRAM (7:0) | HAP | SBSR (25:18) | SBSR (17:9) | SBSR (8:0) | SCSI (31:24) | SCSI (23:16) | SCSI (15:8) | SCSI (7:0) |
|---|---|---|---|---|---|---|---|---|---|---|---|
| 18 | 17 | 16 | 15 | 5 | X | 18 | 17 |   |   |   |   |
| X | 1B | 1A | 19 | 6 | X | X | 1B | 1A | 19 | 18 | 17 |
| X | X | X | X | X | X | X | X | 0 | 0 | 0 | 1B |

EXAMPLE 9

Referring to Table 9 below, this example shows is a 1 byte read from the buffer memory 401 to the SCSI host interface macro 402.

TABLE 9

SCSI Read of 1 Byte from the Buffer

| DRAM (31:24) | DRAM (23:16) | DRAM (15:8) | DRAM (7:0) | HAP | SBSR (25:18) | SBSR (17:9) | SBSR (8:0) | SCSI (31:24) | SCSI (23:16) | SCSI (15:8) | SCSI (7:0) |
|---|---|---|---|---|---|---|---|---|---|---|---|
| 1C | 1B | 1A | 19 | 6 | X | X | X | 0 | 0 | 0 | 1C |

As can be appreciated, the buffer memory system, and management method thereof, described herein allows an efficient use of a buffer memory, allows transfer of partial word data without causing unused gaps in the buffer memory, and thus allows utilization of all memory spaces of the buffer memory.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously Those skilled in the art will recognize that these and other variations are possible with the spirit and scope of the invention as defined in the following claims and their equivalents.

What is claimed is:

1. A method of transferring data to and from a buffer memory organized into a plurality of fixed length words, comprising:

receiving a request to transfer a first data;

determining if transfer of said first data results in a transfer of a partial word;

storing, if transfer of said first data results in a transfer of said partial word, said partial word in a temporary holding area;

receiving a subsequent request to transfer a second data, wherein said request and said subsequent request are write requests;

transferring, if at least a portion of said second data and said partial word together have a sufficient size to produce a complete word, said complete word comprising the portion of said second data and said partial word combined together; and storing any remaining portion of said second data, other than the portion combined with said partial word, in said temporary holding area.

2. The method of transferring data to and from a buffer memory in accordance with claim 1, wherein said step of determining if transfer of said first data results in a transfer of a partial word comprises:

determining whether any data exists in said temporary holding area.

3. The method of transferring data to and from a buffer memory in accordance with claim 1, further comprising:

transferring, if the portion of said second data and said partial word together do not have a sufficient size to produce said complete word, an incomplete word comprising the portion of said second data and said partial word combined together.

4. The method of transferring data to and from a buffer memory in accordance with claim 3, wherein said request and said subsequent request are write requests, said method further comprising:

storing said incomplete word in said temporary holding area.

5. The method of transferring data to and from a buffer memory in accordance with claim 1, wherein said request and said subsequent request are read requests, said method further comprising:

adding, if the portion of said second data and said partial word together do not have a sufficient size to produce said complete word, a sufficient number of preceding zeros to an incomplete word comprising said second data and said partial word combined together to produce a complete word; and transferring said complete word.

6. The method of transferring data to and from a buffer memory in accordance with claim 5, further comprising:

storing said incomplete word in said temporary holding area.

7. An apparatus for transferring data to and from a buffer memory organized into a plurality of fixed length words, comprising:

a data bus configured to receive a request to transfer a first data and a subsequent request to transfer a second data;

a temporary holding area for storing, if transfer of said first data results in a transfer of a partial word, said partial word;

a buffer management unit in operable communication with said data bus, said buffer memory and said temporary holding area, said buffer management unit configured to transfer, if transfer of said first data results in a transfer of said partial word, and if at least a portion of said second data and said partial word together have a sufficient size to produce a complete word, said complete word comprising the portion of said second data and said partial word combined together, and wherein said buffer management unit is further configured to store any remaining portion of said second data, other than the portion combined with said partial word, in said temporary holding area.

8. The apparatus for transferring data to and from a buffer memory according to claim 7, further comprising:

a pointer configured to point to a location of said buffer memory being accessed.

9. The apparatus for transferring data to and from a buffer memory according to claim 7, wherein:

said temporary holding area comprises a register having a width that is one byte less that said fixed word length of said buffer memory.

10. The apparatus for transferring data to and from a buffer memory according to claim 7, wherein:

said buffer management unit is further configured to transfer, if the portion of said second data and said partial word together do not have a sufficient size to produce said complete word, an incomplete word comprising the portion of said second data and said partial word combined together.

11. The apparatus for transferring data to and from a buffer memory according to claim 10, wherein:

said buffer management unit is further configured to store said incomplete word in said temporary holding area.

12. The apparatus for transferring data to and from a buffer memory according to claim 10, wherein:

said request and said subsequent request comprise read requests; and wherein said buffer management unit is further configured to add, if the portion of said second data and said partial word together do not have a sufficient size to produce said complete word, a sufficient number of preceding zeros to an incomplete word comprising said second data and said partial word combined together to produce a complete word, and to transfer said complete word.

13. The apparatus for transferring data to and from a buffer memory according to claim 12, wherein:

said buffer management unit is further configured to store said incomplete word in said temporary holding area.

14. A buffer memory system, comprising:

a buffer memory organized into a plurality of fixed length words;

a byte swap register; and a buffer management unit in communication with said buffer memory and said byte swap register, said buffer management unit being configured to store a partial word, resulting from a data transfer request, in said byte swap register, and said buffer management unit being configured to transfer a completed word produced by combining said partial word stored in said byte swap register and at least a portion of data in a subsequent data transfer request, and wherein said buffer management unit is further configured to store any remaining portion of said data, other than the portion combined with said partial word, in said byte swap register.

15. The buffer memory system according to claim 14, wherein:

said buffer management unit is further configured to transfer, if the portion of said data and said partial word together do not have a sufficient size to produce said complete word, an incomplete word comprising the portion of said data and said partial word combined together.

16. The buffer memory system according to claim 15, wherein:

said buffer management unit is further configured to store said incomplete word in said byte swap register.

17. The buffer memory system according to claim 15, wherein:

said data transfer request and said subsequent data transfer request comprise read requests; and wherein said buffer management unit is further configured to add, if the portion of said data and said partial word together do not have a sufficient size to produce said complete word, a sufficient number of preceding zeros to an incomplete word comprising said data and said partial word combined together to produce a complete word, and to transfer said complete word, and to store said incomplete word in said byte swap register.

18. A method of transferring data to and from a buffer memory organized into a plurality of fixed length words, comprising:

receiving a request to transfer a first data;

determining if transfer of said first data results in a transfer of a partial word;

storing, if transfer of said first data results in a transfer of said partial word, said partial word in a temporary holding area;

receiving a subsequent request to transfer a second data, wherein said request and said subsequent request are read requests;

transferring, if at least a portion of said second data and said partial word together have a sufficient size to produce a complete word, said complete word comprising the portion of said second data and said partial word combined together; and adding, if the portion of said second data and said partial word together do not have a sufficient size to produce said complete word, a sufficient number of preceding zeros to an incomplete word comprising said second data and said partial word combined together to produce a complete word; and transferring said complete word.

19. The method of transferring data to and from a buffer memory in accordance with claim 18, further comprising:

storing said incomplete word in said temporary holding area.

20. An apparatus for transferring data to and from a buffer memory organized into a plurality of fixed length words, comprising:

a data bus configured to receive a request to transfer a first data and a subsequent request to transfer a data, wherein said request and said subsequent request comprise read requests;

a temporary holding area for storing, if transfer of said first data results in a transfer of a partial word, said partial word;

a buffer management unit in operable communication with said data bus, said buffer memory and said temporary holding area, said buffer management unit configured to transfer, if transfer of said first data results in a transfer of said partial word, and if at least a portion of said second data and said partial word together have a sufficient size to produce a complete word, said complete word comprising the portion of said second data and said partial word combined together, and wherein said buffer management unit is further configured to add, if the portion of said second data and said partial word together do not have a sufficient size to produce said complete word, a sufficient number of preceding zeros to an incomplete word comprising said second data and said partial word combined together to produce a complete word, and to transfer said complete word.

21. The apparatus for transferring data to and from a buffer memory according to claim 20, wherein:

said buffer management unit is further configured to store said incomplete word in said temporary holding area.

22. A buffer memory system, comprising:

a buffer memory organized into a plurality of fixed length words;

a byte swap register; and a buffer management unit in communication with said buffer memory and said byte swap register, said buffer management unit being configured to store a partial word, resulting from a data transfer request, in said byte swap register, and said buffer management unit being configured to transfer a completed word produced by combining said partial word stored in said byte swap register and at least a portion of data in a subsequent data transfer request, wherein said data transfer request and said subsequent data transfer request comprise read requests, and wherein said buffer management unit is further configured to add, if the portion of said data and said partial word together do not have a sufficient size to produce said complete word, a sufficient number of preceding zeros to an incomplete word comprising said data and said partial word combined together to produce a complete word, and to transfer said complete word, and to store said incomplete word in said byte swap register.

* * * * *